United States Patent
Du et al.

(10) Patent No.: US 6,909,318 B2
(45) Date of Patent: *Jun. 21, 2005

(54) CMOS VOLTAGE BOOSTER CIRCUIT

(75) Inventors: Xiao Hong Du, Colorado Springs, CO (US); Jarrod Eliason, Colorado Springs, CO (US); Yunchen Qiu, Plano, TX (US); Bill Kraus, Palmer Lake, CO (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/649,405

(22) Filed: Aug. 27, 2003

(65) Prior Publication Data

US 2004/0130382 A1 Jul. 8, 2004

Related U.S. Application Data

(63) Continuation-in-part of application No. 10/337,053, filed on Jan. 6, 2003, now Pat. No. 6,864,738.

(51) Int. Cl.$^7$ .............................. G05F 1/10; G05F 3/02
(52) U.S. Cl. ...................................... 327/536
(58) Field of Search ................. 327/536, 589, 327/390; 363/59–60; 365/189.11

(56) References Cited

U.S. PATENT DOCUMENTS

| | | | | |
|---|---|---|---|---|
| 5,594,380 A | * | 1/1997 | Nam | 327/390 |
| 5,917,348 A | * | 6/1999 | Chow | 327/108 |
| 2001/0019286 A1 | * | 9/2001 | Naganawa | 327/536 |
| 2002/0130702 A1 | * | 9/2002 | Byeon et al. | 327/536 |

* cited by examiner

*Primary Examiner*—Quan Tra
(74) *Attorney, Agent, or Firm*—W. Daniel Swayze, Jr.; W. James Brady; Frederick J. Telecky, Jr.

(57) ABSTRACT

This invention is a new CMOS voltage booster (20) having an output which can be used in memories to boost the word line voltage above VDD or other voltage boosting applications. The CMOS booster includes a NMOS FET (MN1) to charge a boosting capacitor (C1) to VDD at the end of each memory access and includes a PMOS FET (MP1, MP2) to keep the voltage at the output at VDD during standby. By using this combination, the word line rise time, the size of the booster, and the power consumption during access are significantly reduced. The gate of the NMOS FET (MN1) is boosted above VDD+Vthn by a small capacitor (C2) to charge the word line boosting capacitor to VDD at the end of each memory access. The small capacitor (C2) is precharged to VDD by a NMOSFET (MN2) whose gate is connected to the word line boosting capacitor. The gate of each PMOS FET (MP1, MP2) is shorted to ists source to turn if off during boostenig. Ttransistor (MP3) facilitates boosting the NMOS FET (MN1) above VDD.

21 Claims, 3 Drawing Sheets

CMOS VOLTAGE BOOSTER CIRCUIT

CROSS REFERENCE TO RELATED APPLICATION

This application is a continuation-in-part of commonly assigned U.S. patent application Ser. No. 10/337,053 entitled CMOS Voltage Booster Circuits filed Jan. 6, 2003 now U.S. Pat. No. 6,864,738.

FIELD OF THE INVENTION

The present invention is generally related to voltage boosting circuits, and more particularly to pre-charging voltage boosting circuits.

BACKGROUND OF THE INVENTION

FIG. 1 illustrates at 10 the concept of voltage boosting. The purpose of a voltage booster is to generate a specified voltage higher than VDD at node V-boosted, where VDD is the power supply voltage. A voltage booster basically contains two parts: a pre-charge circuit and a boosting capacitor (C boost). Before node Boost_Ct1 is pulled to high, the pre-charge circuit charges node Ncb to some positive voltage. Then, node Boost_Ct1 is pulled to VDD and switch S1 is turned on to charge load capacitor C_load to a voltage level above VDD. This boosted voltage level is determined by the voltage at node Ncb before Boost_Ct1 goes high and the ratio of C_boost/C_load. The lower the pre-charged voltage at node Ncb, the larger the capacitance ratio is needed, and the larger the area cost for capacitor C_boost. Thus, it is best to pre-charge node Ncb to VDD before Boost_Ct1 starts going high.

There are four ways known in the prior art of voltage boosters to pre-charge C_boost to VDD:

1) As shown in U.S. Pat. Nos. 5,999,461 and 4,186,436, when the boosted voltage is needed, the pre-charge circuit is enabled, but Boost_Ct1 is not pulled to high until node Ncb is charged to VDD. Obviously, the major disadvantage is that some delay must be introduced. Thus, this scheme is not applicable to high speed devices.

2) As shown in U.S. Pat. Nos. 6,268,761 and 6,275,425, PMOS transistors are used to pre-charge node Ncb to VDD and keep the voltage at VDD during standby. The disadvantage is that the sizes of the PMOS transistors are huge when capacitor C_boost is large and pre-charging must be completed in a short time.

3) As shown in U.S. Pat. Nos. 5,175,448 and 5,636,115, NMOS transistors with their gate boosted above VDD are used to pre-charge node Ncb to VDD during standby. The advantage of using NMOS transistors is that the sizes of the transistors can be much smaller due to the higher drive capability of NMOSFET than PMOSFET. However, the voltage at node Ncb cannot be kept at VDD for a long time due to various leakages. When the voltage at node Ncb decreases, the size of capacitor C_boost must be increased in order to boost the voltage to the same level.

4) As shown in U.S. Pat. No. 5,701,096 charge pumps are used to continuously supply charge to capacitor C-boost and keep the voltage at some level. However, complex timing and control circuits must be introduced.

In one conventional memory application, a voltage booster is needed to boost the word line above VDD to VDD+Vthn, and the memory access time is about 11 ns. This means that there is no time for pre-charging the boosting capacitor after the chip is enabled, and the cycle time is about 20 ns. Thus, the boost capacitor must be quickly pre-charged to VDD as soon as the memory access is terminated. In the technique described in 3) above, the NMOS transistors are used as pre-charge devices. The boost capacitor is huge (60 pf) because the voltage on the booster capacitor decreases to a level below VDD due to the leakages. Furthermore, it takes a long time to pre-charge the boost capacitor to VDD due to the huge size.

SUMMARY OF THE INVENTION

The embodiments of the present invention take the advantages of both PMOS and NMOS transistors. A NMOS transistor with its gate boosted above VDD to VDD+Vthn is used to quickly charge the boosting capacitor to VDD at the end of each memory access and two small PMOS transistors connected back-to-back are used to keep the voltage at VDD during standby. This combination provides high speed with small devices and meets the voltage requirements. Compared the capacitor size is reduced from 60 pf to 10 pf, the power consumption is reduced by 76% during a memory access, and the boosting speed is significantly improved.

DETAILED DESCRIPTION OF THE PREFERRED EMBODIMENT

Figure 1:
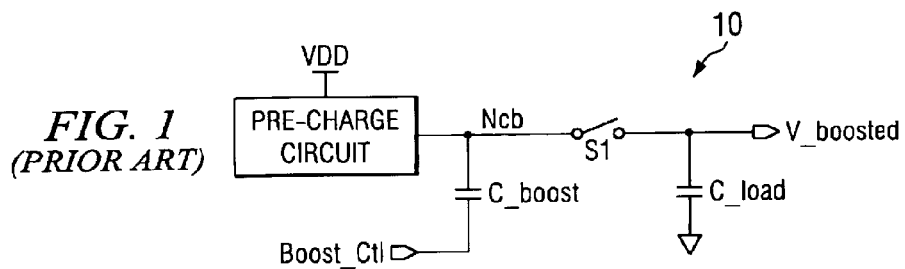
FIG. 1 is a schematic depicting conventional voltage boosting.
Figure 2:
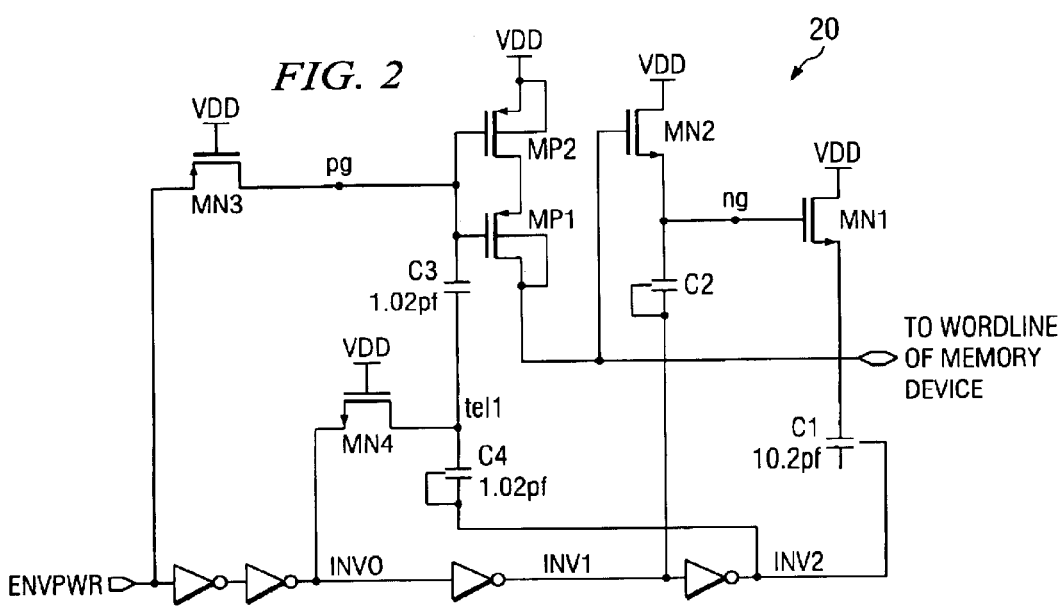
FIG. 2 is a schematic of one embodiment of the CMOS voltage booster according to the present invention.

Referring now to FIG. 2 there is shown a detailed electrical schematic of a first preferred embodiment of the present invention being a CMOS voltage booster 20. This circuit 20 keeps the voltage of node VPWR at VDD when signal ENVPWR is low and boosts the voltage of node VPWR above VDD to VDD+Vthn as soon as possible when signal ENVPWR becomes high, where VDD is the power source voltage and Vthn is the threshold voltage of a NMOS FET. Capacitor C1 is the main voltage booster capacitor which advantageously boosts the voltage at node VPWR when node inv2 becomes high. NMOS FET MN1 charges capacitor C1 to VDD and PMOS transistors MP1 and MP2 keep the VPWR voltage at VDD during standby.

An application of this circuit 20 is to boost the voltage at a word line of a memory device above VDD to VDD+Vthn when signal ENVPWR is pulled to VDD and node VPWR is connected to the word line during a memory access.

Circuit 20 provides technical advantages by taking advantage of higher drive ability of a NMOS FET than a PMOS FET, whereby NMOSFET MN1 with its gate ng boosted above VDD to VDD+Vthn is used to quickly charge the boosting capacitor C1 to VDD at the end of each memory access. However, the NMOSFET MN1 cannot keep the voltage at capacitor C1 at VDD for a long time and thus the voltage at VPWR will eventually decrease to a level below VDD due to various leakages. To overcome this, two small PMOS transistors MP1 and MP2 are advantageously provided to keep the voltage of node VPWR at VDD during standby. This combination takes both the advantages of NMOS and PMOS transistors to reach high speeds with small devices and also meet the voltage requirements over time.

Moreover, the gate of NMOSFET MN1 is boosted above VDD to VDD+Vthn by a small capacitor C2 at the end of each memory access. The gate of NMOSFET MN2 is connected to node VPWR. When node VPWR is boosted above VDD to VDD+Vthn during a memory access, the gate of NMOSFET MN2 is boosted to the same voltage and capacitor C2 is charged to VDD by NMOSFET MN2. Advantageously, no separate timing control and boosting circuits are needed for boosting the gate of NMOSFET MN2 with this design.

In addition, the gates of the PMOS transistors MP1 and MP2 are advantageously boosted by small capacitors C3 and C4 to a voltage close to the voltage at node VPWR to turn MP1 off when node VPWR is boosted above VDD by capacitor C1.

Advantageously, the moment that signal ENVPWR starts going high, node inv0 is still low. NMOSFET MN4 shunts node tell to low and NMOSFET MN3 charges capacitor C3 to some positive voltage. Similarly, NMOSFET MN4 charges node tell to some positive voltage when node inv2 is still low. Finally, when node inv2 becomes high, node VPWR and node pg are boosted above VDD at the same time. Thus, no separate timing control circuit is needed for boosting the gate of PMOS transistor MP1.

In addition, by simply tying the gates of NMOS transistors MN3 and MN4 to VDD, these two transistors are able to play two functions: discharge nodes pg and tell to ground when signal ENVPWR is low and isolate nodes pg and tell from nodes ENVPWR and inv0 when signal ENVPWR is high and nodes pg and tell are boosted above VDD.

Moreover, in this voltage booster circuit 20, the voltages at some nodes are boosted to a level higher than VDD and may cause some breakdown. Thus, the maximum gate voltage stress is an important reliability issue in any booster circuit. A big advantage for this circuit 20 is that the voltage applied between gate and source is always lower than VDD for all the transistors in the circuit 20. Thus, the maximum gate stress is always within the safe region.

Figure 3:
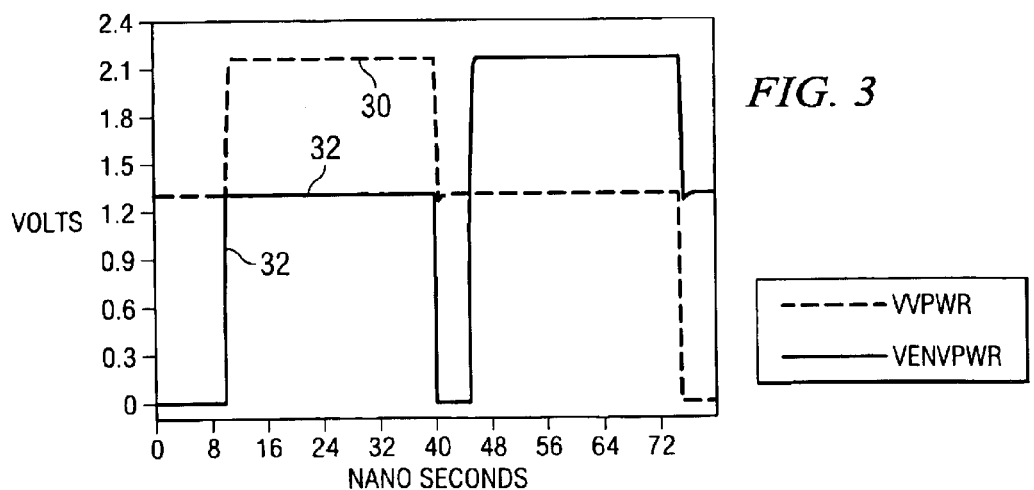
FIG. 3 is a graph of voltage VPWR with a 5 pf load capacitor.

FIG. 3 graphically shows at 30 the voltage VPWR at node VPWR from spice simulation for a nominal process, room temperature and VDD=1.3V, with a 5 pf load capacitor connected to the VPWR. As shown at 32, when signal ENVPWR becomes high, node VPWR can be boosted above 2.1V. When signal ENVPWR becomes low at the end of an access, the voltage at node VPWR can be recovered to VDD within 3 ns and kept at VDD.

Figure 4:
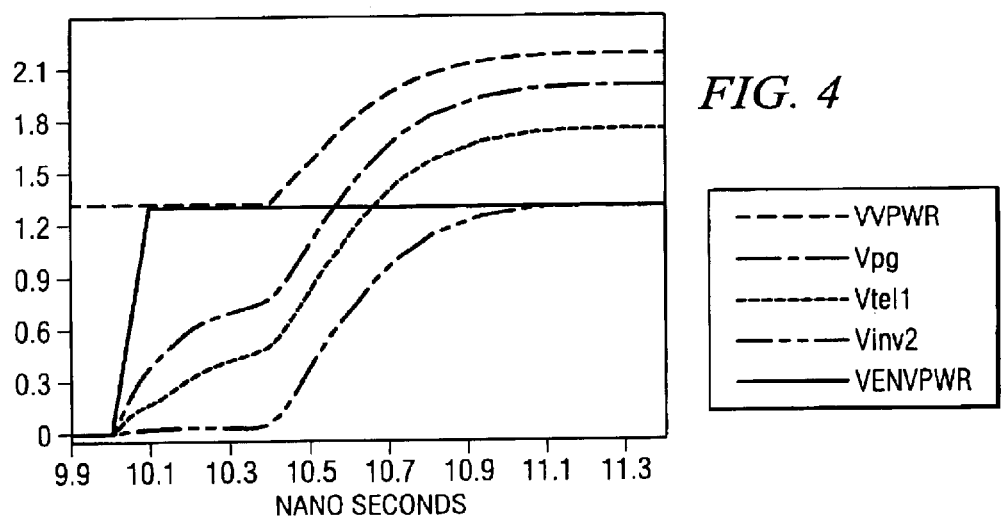
FIG. 4 is a graph of various voltages illustrating that the voltage of node pg is the same potential as node VPWR during boosting.

As shown in FIG. 4, when signal ENVPWR starts going high at 10 ns, voltage Vpg at node pg starts going up. After a slight delay node tell starts going up. At about 10.4 ns, node inv2 starts going up. At this moment, the voltage at node pg is about 0.7V. At about 11.1 ns, node inv2 reaches VDD, and the voltages at VPWR and pg are boosted to above 2.1V and 1.9V, respectively.

Figure 5:
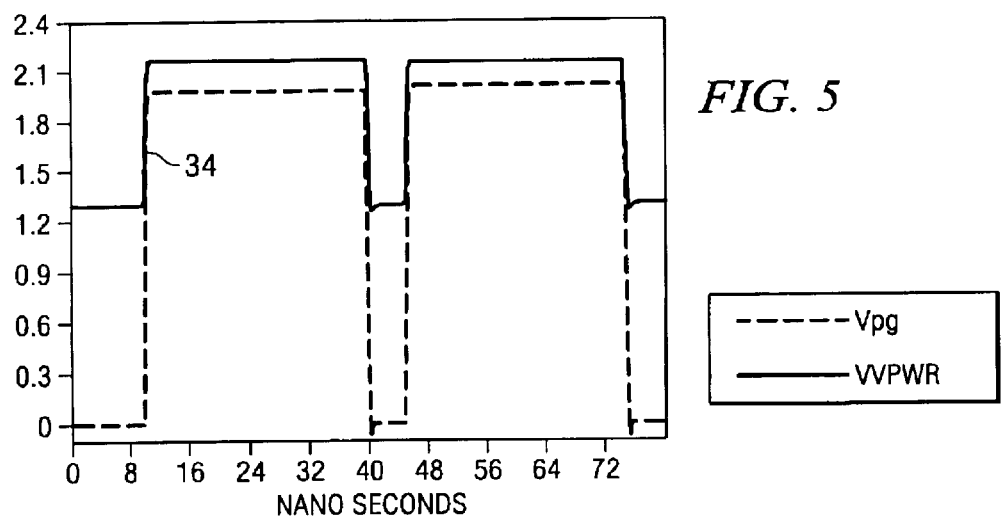
FIG. 5 is a graph exhibiting the voltages of VPWR and pg during two memory accesses.

FIG. 5 shows the voltages at node VPWR and node pg during two memory accesses. The voltage difference between node VPWR and node pg is less than 0.2V, thus transistor MP1 is kept off during boosting. At the end of boosting, node pg is quickly discharged to ground and transistors MP1 and MP2 are fully turned on to help charging of node VPWR back to VDD.

Figure 6:
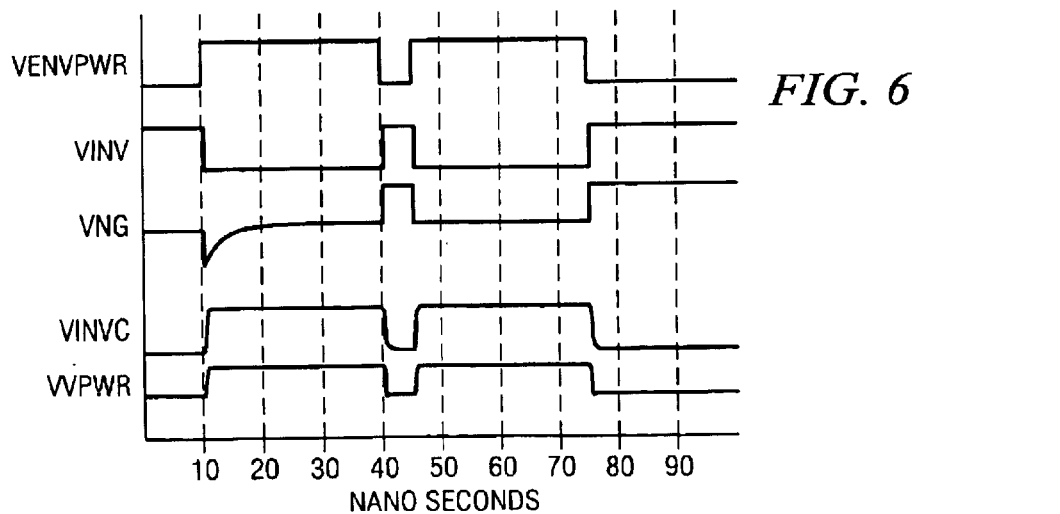
FIG. 6 is a graph of the voltage sequence for boosting the gate of NMOS transistor MN1.

The voltages shown in FIG. 6 exhibit the sequence of boosting the gate of NMOS transistor MN1. When signal ENVPWR becomes high, node inv1 goes low after a slight delay. Node ng is pulled below VDD. Note that this dip only occurs during the first memory access. After that, the capacitor C2 will be charged to VDD during each memory access. After a small delay, node inv2 goes high and boosts node VPWR above VDD to VDD+Vthn. Since the gate of NMOS transistor MN2 is connected to node VPWR, NMOS transistor MN2 is fully turned on and drives node ng to VDD. NMOS transistor MN1 is off and capacitor C2 is charged to VDD. When signal ENVPWR becomes low, node inv1 goes high after a slight delay and capacitor C2 boosts the gate of NMOS transistor MN1 above VDD to VDD+Vthn. NMOS transistor MN1 is fully turned on and quickly drives node VPWR back to VDD.

Figure 7:
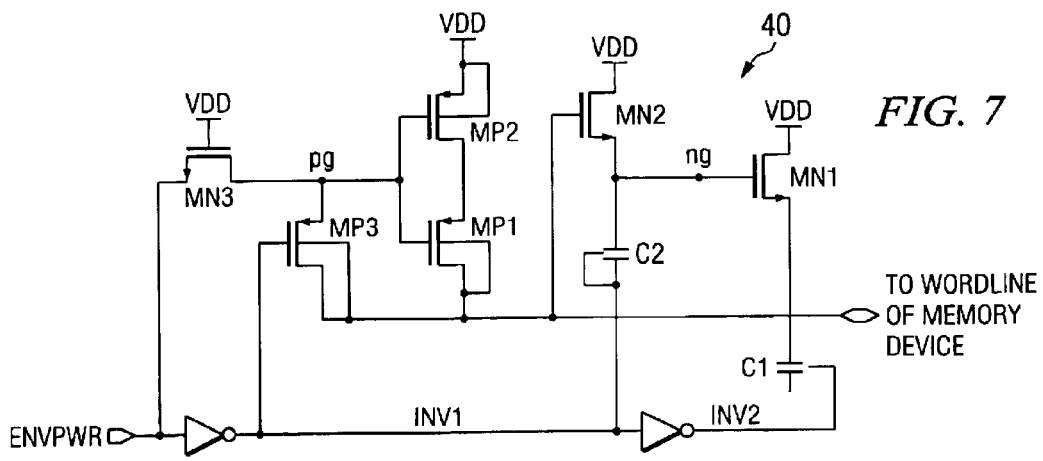
FIG. 7 is a schematic of a second embodiment of the CMOS voltage booster according to the present invention.

Referring now to FIG. 7, there is shown a second preferred embodiment of the present invention, which is similar to the first preferred embodiment shown and described in reference to FIG. 2, wherein like numerals refer to like elements.

In the circuit 40, the small boost capacitors C3 and C4 are not utilized, and a PMOS FET MP3 shorts the output line VPWR to low at the moment voltage ENVPWR starts going high and node INV1 is still low. Similarly, transistor MP3 allows output line VPWR to achieve a positive voltage when node INV2 is still low. When node INV2 becomes high, VPWR and node pg are boosted above VDD at the same time. Advantageously, no separate timing control circuit is needed for boosting the gate of transistor MP1. The gate of transistor MN3 is tied to high, such that transistor MN3 discharges node pg to ground when control signal ENVPWR is low and isolates node INV1 from ENVPWR when ENVPWR is high and node pg is boosted above VDD.

Like the circuit 10 of the first embodiment, circuit 40 prevents breakdown of transistors when boosting some nodes, including node pg, above VDD. Thus, the maximum gate voltage stress in the boost circuit is controlled providing a reliable circuit. Advantageously, all the transistors in circuit 40 are configured such that a voltage applied between the respective gate and source is always lower than VDD, and the maximum gate stress is always within the safe region.

Figure 8:
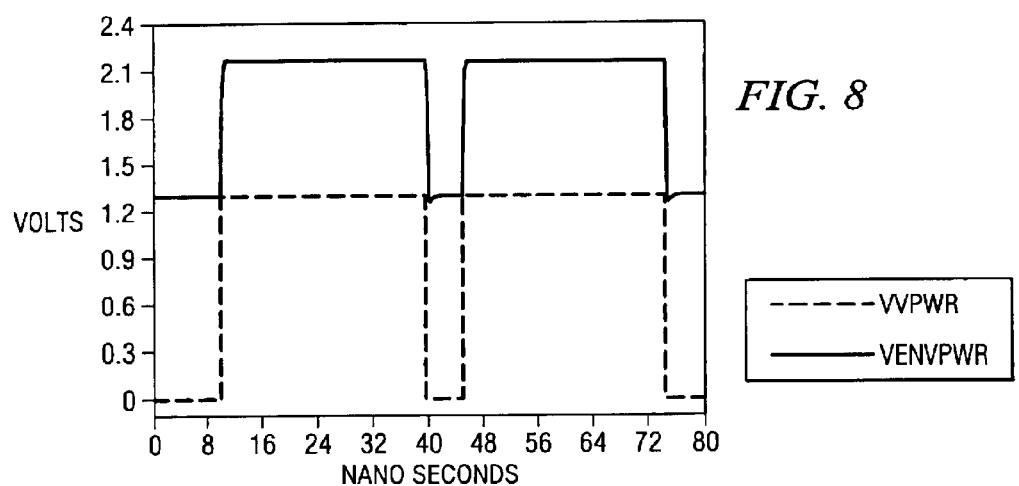
FIG. 8 is a graph of VPWR with a 5 pf load capacitor for the embodiment of FIG. 6.

FIG. 8 is a graph of signal VPWR of circuit 40 with a 5 pf load capacitor.

Figure 9:
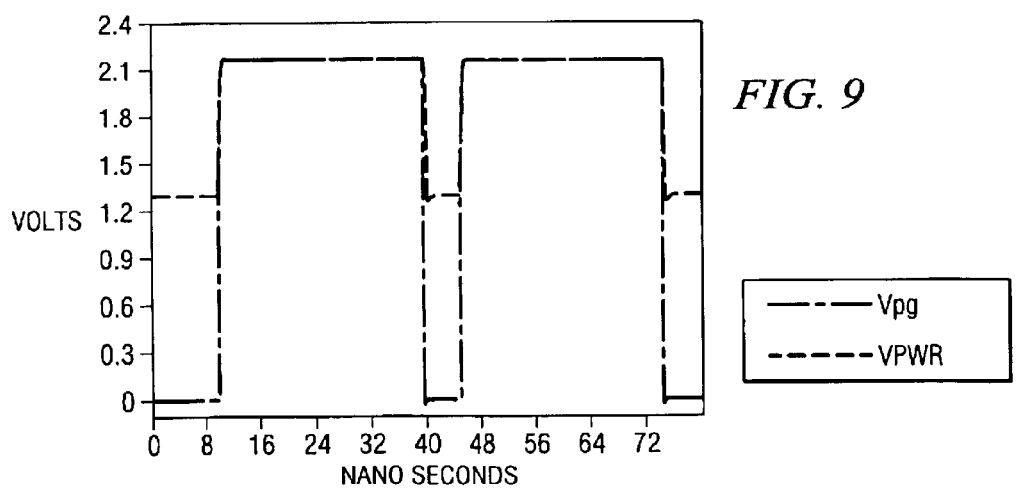
FIG. 9 is a graph of the voltage of node pg and node VPWR, where transistor MP3 effectively shorts nodes pg and VPWR, and turns transistor MP1 off during boosting.

FIG. 9 is a graph of the voltage of node pg and node VPWR where transistor MP3 effectively shorts nodes pg and VPWR, and turns transistor MP1 off during boost.

FIG. 6 also represents the voltage sequence for boosting the gate of NMOS transistor MN1 of circuit 40.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. A voltage booster, comprising:
   an input;
   an output;
   a boost capacitor coupled to the output; and
   a pre-charge circuit operating from voltage VDD and coupled to the boost capacitor and driving the output, the pre-charge circuit having both a first NMOS transistor and a first PMOS transistor coupled between VDD and the output, wherein a gate of the first NMOS transistor is boosted above VDD to quickly charge the boost capacitor before driving the output, further comprising a third transistor selectively coupling the gate of the first PMOS transistor to the output.

2. The voltage booster as specified in claim 1 wherein the third transistor couples the gate of the first PMOS transistor to the boost capacitor when the output is not enabled.

3. The voltage booster as specified in claim 1 wherein the third transistor shunts the output to low at the moment an input voltage at the input starts going high.

4. The voltage booster as specified in claim 3 wherein the third transistor gate is coupled via an inverter to the input.

5. The voltage booster as specified in claim 1 wherein the third transistor allows the output to achieve a positive voltage when a non-charging side of the boost capacitor is still low.

6. The voltage booster as specified in claim 1 wherein the gate of the first PMOS transistor is boosted above VDD when the input is enabled.

7. The voltage booster as specified in claim 1 wherein the gate of the first NMOS transistor and the output are boosted above VDD at the same time.

8. The voltage booster a specified in claim 1 further comprising a second PMOS transistor coupled back-to-back with the PMOS first transistor.

9. The voltage booster as specified in claim 1 further comprising a second NMOS transistor coupled back-to-back with the first NMOS transistor.

10. The voltage booster as specified in claim 1 wherein the first NMOS transistor has a higher drive ability than the first PMOS transistor.

11. The voltage booster as specified in claim 1 wherein the gate of the first NMOS transistor is coupled to the output and is boosted when the output is boosted.

12. The voltage booster as specified in claim 1 wherein the third transistor is a PMOS transistor.

13. The voltage booster as specified in claim 1 further comprising a fourth transistor coupling the input to the gate of the first PMOS transistor.

14. The voltage booster as specified in claim 13 wherein the gate of the fourth transistor is coupled to VDD.

15. The voltage booster as specified in claim 13 wherein the fourth transistor discharges the gate of the first PMOS transistor when the output is disabled.

16. The voltage booster as specified in claim 15 wherein the fourth transistor also isolates the gate of the first PMOS transistor from the output when the output is enabled.

17. The voltage booster as specified in claim 1 further comprising a memory device wherein the output is coupled to and drives a word line of the memory device.

18. The voltage booster as specified in claim 17 wherein the output is boosted above VDD during a memory access.

19. The voltage booster as specified in claim 18 wherein the first PMOS device drives the output initially during the memory access.

20. The voltage booster as specified in claim 19 wherein the first PMOS transistor keeps the voltage at the output at VDD during standby.

21. The voltage booster as specified in claim 17 further comprising a first capacitor coupled to and boosting the gate of the first NMOS transistor.

* * * * *